United States Patent [19]

Bonsky et al.

[11] 3,757,049

[45] Sept. 4, 1973

[54] TELEPHONE ANSWERING INSTRUMENT AND SYSTEM

[75] Inventors: Elmer C. Bonsky, Long Beach; Lawrence A. Curtis, Huntington Beach, both of Calif.

[73] Assignee: T.A.D. Avanti, Inc., Paramount, Calif.

[22] Filed: Oct. 14, 1971

[21] Appl. No.: 189,268

[52] U.S. Cl. .................................................. 179/6 E

[51] Int. Cl. ............................................ H04m 1/64

[58] Field of Search .................. 179/6 R, 6 E, 6 AC, 179/6 C

[56] References Cited

UNITED STATES PATENTS

| | | | |
|---|---|---|---|
| 3,136,856 | 6/1964 | Zimmermann | 179/6 E |
| 3,508,004 | 4/1970 | Waldman | 179/6 E |
| 3,524,936 | 8/1970 | Hill | 179/6 E |
| 2,665,337 | 1/1954 | Handschin | 179/6 E |
| 3,410,959 | 11/1968 | Lamberg | 179/6 R |
| 2,912,504 | 11/1959 | Dagnall | 179/6 R |
| 2,525,763 | 10/1950 | Beatty | 179/6 R |
| 2,743,315 | 4/1956 | VanDeventer | 179/6 R |
| 3,445,660 | 5/1969 | Todd | 179/6 R |
| 3,133,992 | 5/1964 | Dickman | 179/6 R |

FOREIGN PATENTS OR APPLICATIONS

| | | | |
|---|---|---|---|
| 1,056,277 | 1/1967 | Great Britain | 179/6 R |

*Primary Examiner*—Raymond F. Cardillo, Jr.
*Attorney*—Jessup & Beecher

[57] ABSTRACT

A telephone answering instrument and system is provided which is constructed so that the calling party may record a message of any length within the recording capabilities of the message tape of the answering system, the system continuing to operate until the calling party actually hangs up. The instrument and system of the invention also has a feature in that it may be set to respond only after a predetermined number of phone rings has been received, in the event the user wishes to leave the equipment activated, and to answer the phone himself if he is available. In addition, the system may be operated from a remote point, whereby a caller sends a coded signal over the telephone line to cause the equipment to transmit to him the messages recorded on the message tape. The remotely controlled equipment to be described may be caused to backspace and then read over all the accumulated messages to the remote caller.

2 Claims, 4 Drawing Figures

INVENTORS:
Elmer C. Bansky
Lawrence A. Curtis
Jemp and Beecher
By Keith D. Beecher
ATTORNEYS INVENTORS:
Elmer C. Bonsky
Lawrence A. Curtis
Jessup and Beecher
By Keith D. Beecher
ATTORNEYS INVENTORS:
Elmer C. Bonsky
Lawrence A. Curtis
By Jessup and Beecher
Keith D. Beecher
ATTORNEYS

TELEPHONE ANSWERING INSTRUMENT AND SYSTEM

BACKGROUND OF THE INVENTION

The telephone answering system of the present invention is similar in some respects to the telephone answering instrument and system described and claimed in copending application Ser. No. 52,636, filed July 6, 1970, in the name of Francis A. Foresta and Elmer C. Bonsky, which application has been abandoned and replaced by continuation application Ser. No. 238,470, filed Mar. 27, 1972.

Specifically, the telephone answering system and apparatus of the present invention is of the general type which includes a sensing circuit which responds to a ring signal on the telephone line, or to the ring of the associated telephone, to activate the answering instrument. When that occurs, a recorded message is transmitted over the phone line to the calling party. A message recording tape is then activated within the answering instrument in order that the calling party may then record his message. In the apparatus to be described, the message recording equipment remains activated until the calling party hangs up, so that the calling party is not limited to any particular prescribed time interval in which to record his message.

The telephone answering instrument and system to be described, as mentioned above, is also susceptible to remote control whereby it may transmit over the telephone line to any remote point, upon the receipt of a coded control signal, the messages stored therein. This enables the user of the machine, should he be at any part of the world, to call his home office and activate his machine. Then, he may send a coded signal over the phone line, and the machine will automatically respond and transmit to him all the recorded messages. In the equipment of the present invention, a further control is provided in that the user may, by transmitting a second coded signal over the phone line, backspace his equipment, so that recorded messages may be repeated.

For the remote control of the instrument, a small transmitter unit is provided which transmits over the telephone line audible tones of a selected frequency. First, the telephone number is dialed which corresponds to the telephone at which the answering instrument is located. After the answering instrument "answers" the telephone, the remote control transmitter unit is activated to transmit a first tone of a selected frequency over the telephone line to the answering instrument. Upon the receipt of the first tone, the instrument resets its message recording tape to its origin position, and then plays the various messages recorded on the tape over the telephone line to the distant caller. The caller may also send a second coded tone over the telephone line at any time to cause the machine to "back up" and repeat the messages.

As mentioned above, the instrument and system of the present invention also includes a control so that a preset number of rings must occur before the instrument will respond, for the reasons specified above.

DETAILED DESCRIPTION OF THE ILLUSTRATED EMBODIMENT

Figure 1:
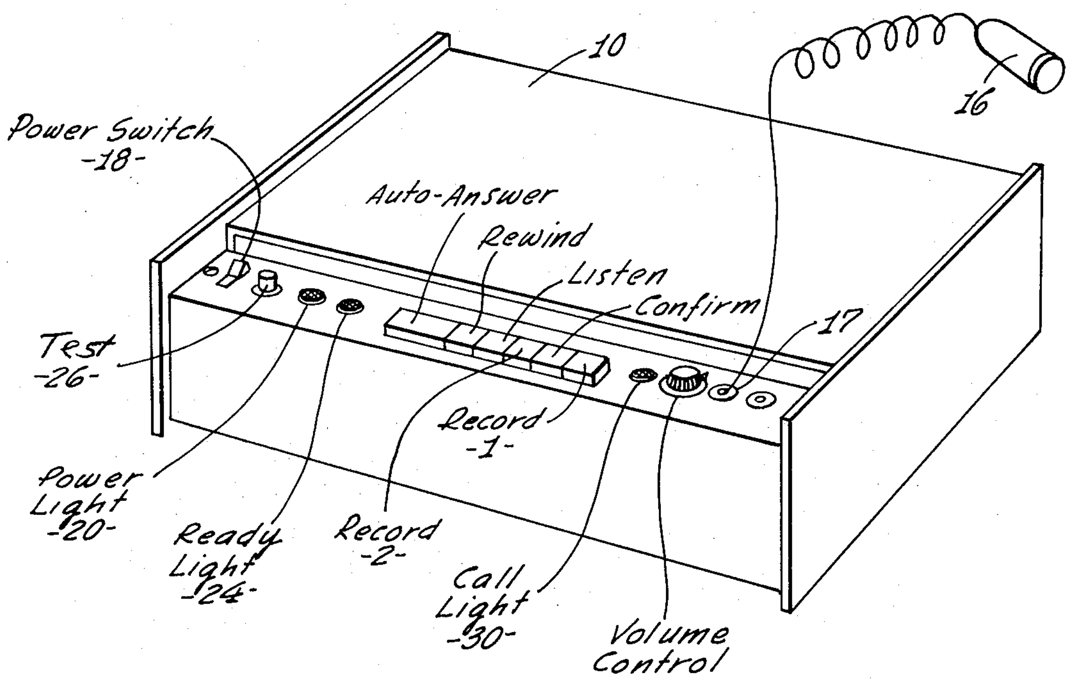
FIG. 1 is a perspective representation of a telephone answering system representing one embodiment of the invention.

The telephone answering unit shown in FIG. 1 is one which is constructed for direct use in conjunction with a telephone line, and which may be plugged into a usual telephone jack. The unit includes a housing 10 for the electronic control circuitry. A microphone 16 may be plugged into a jack 17 in the side of the housing 10 for recording announcements or dictation, as will be described. A series of push button switches are mounted on the forward edge of the housing 10, and these are designated "AUTO", "REWIND", "LISTEN", "RECORD 2", "CONFIRM", "RECORD 1". A thumb operated "On-Off" power switch 18 is also mounted on the forward edge of the housing, as is the thumb actuated volume control 22. A "MONITOR" switch is also mounted on the unit. In addition, a series of indicator lights 20, 24 and 30 are positioned on the forward edge of the housing 10, these lights being designated "POWER", "READY", and "CALL" respectively.

The telephone answering system is equipped with a loop tape on which an announcement is recorded by means of the microphone 16, so that at any time a telephone ring signal is received, the announcement is automatically transmitted to the calling party. In order to record the announcement on the loop tape, the microphone 16 is plugged into the jack 17 on the front edge of the instrument, and the volume control 22 is set to a predetermined position. The "RECORD 1" push button switch is then depressed, and the power switch 18 is turned. The "READY" light 24 will glow, and the loop announcement tape will automatically set itself to its origin position, at which time the "READY" light 24 turns off. The "TEST" push button switch 26 is then depressed, and the announcement to be recorded on the loop announcement tape is spoken into the microphone 16.

The instrument also includes a message tape on which incoming calls are recorded. After the announcement has been recorded on the announcement tape in the manner described above, the "REWIND" push button switch is depressed to rewind the message tape and establish it at its "START" position.

To condition the instrument to answer incoming calls, the "AUTO-ANSWER" push button is depressed. At this time both the "READY" light 24 and the "CALL" light 30 turn on, the "CALL" light remaining on until a message is received. If the user finds the "CALL" light off, he may push the "REWIND" push button switch and rewind the message tape. He may then push the "LISTEN" push button switch to activate the tape and cause all recorded messages to be reproduced through the speaker SP of FIG. 3B. In order to erase the messages, both the "REWIND" and "RECORD 2" push button switches are depressed at the same time, and the tape is returned to its origin position with all previous calls being erased.

Figure 2:
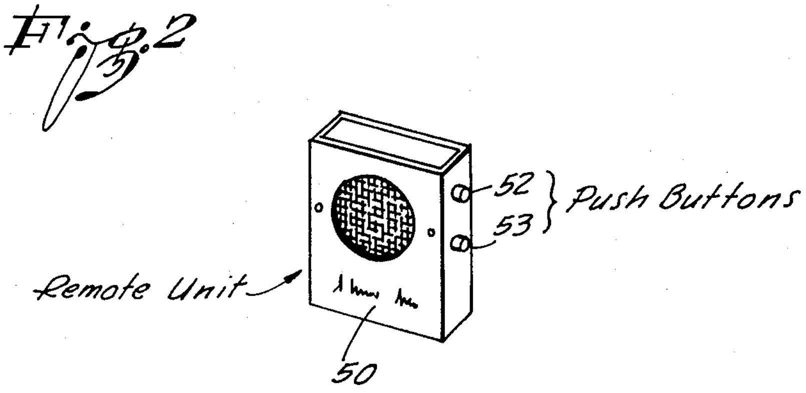
FIG. 2 is a perspective representation of a remote control transmitter unit which may be used to activate the instrument of FIG. 1 from a remote point by transmitting an appropriate tone signal over the telephone line.

A remote control unit 50 is shown in FIG. 2 which includes a push button control 52. The remote control unit permits the instrument of FIG. 1 to be operated from a remote point. This is achieved by dialing the phone number of the telephone serviced by the instrument, and by then depressing the push button 52. This causes the unit 50 to emit a distinct tone which is transmitted over the phone line and which is picked up by the circuitry of the instrument 10. The remote unit 50 also includes a second push button 53 which is operated to cause the instrument to backspace, as will be described.

When the instrument is called from the remote point, and the push button 52 of the unit 50 operated, the message tape on the instrument 10 is caused to rewind to its origin position, and is then caused to reproduce the various messages recorded on the tape, these messages being transmitted over the telephone line to the caller at the remote point. At the end of the reception of the messages at the remote point, the push button 52 may again be actuated in order to stop the message tape in the instrument of FIG. 1, so that it is ready to receive and record additional messages. In addition, the push button 53 may be depressed to cause the message tape to backspace so that messages may be reread, if so desired.

Figure 3A:
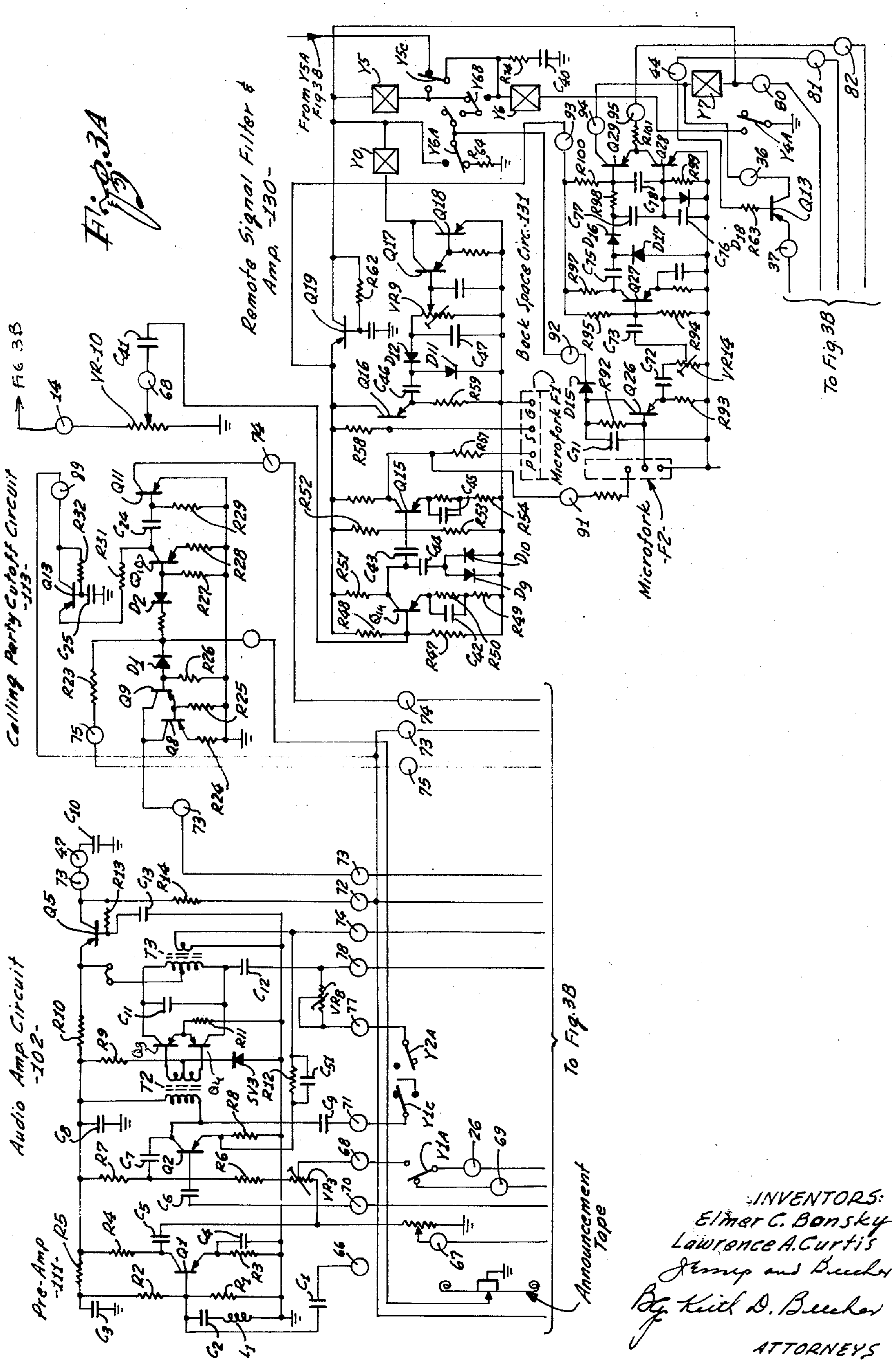
FIGS. 3A and 3B are circuit diagrams of the electronic circuitry incorporated within the system.
Figure 3B:
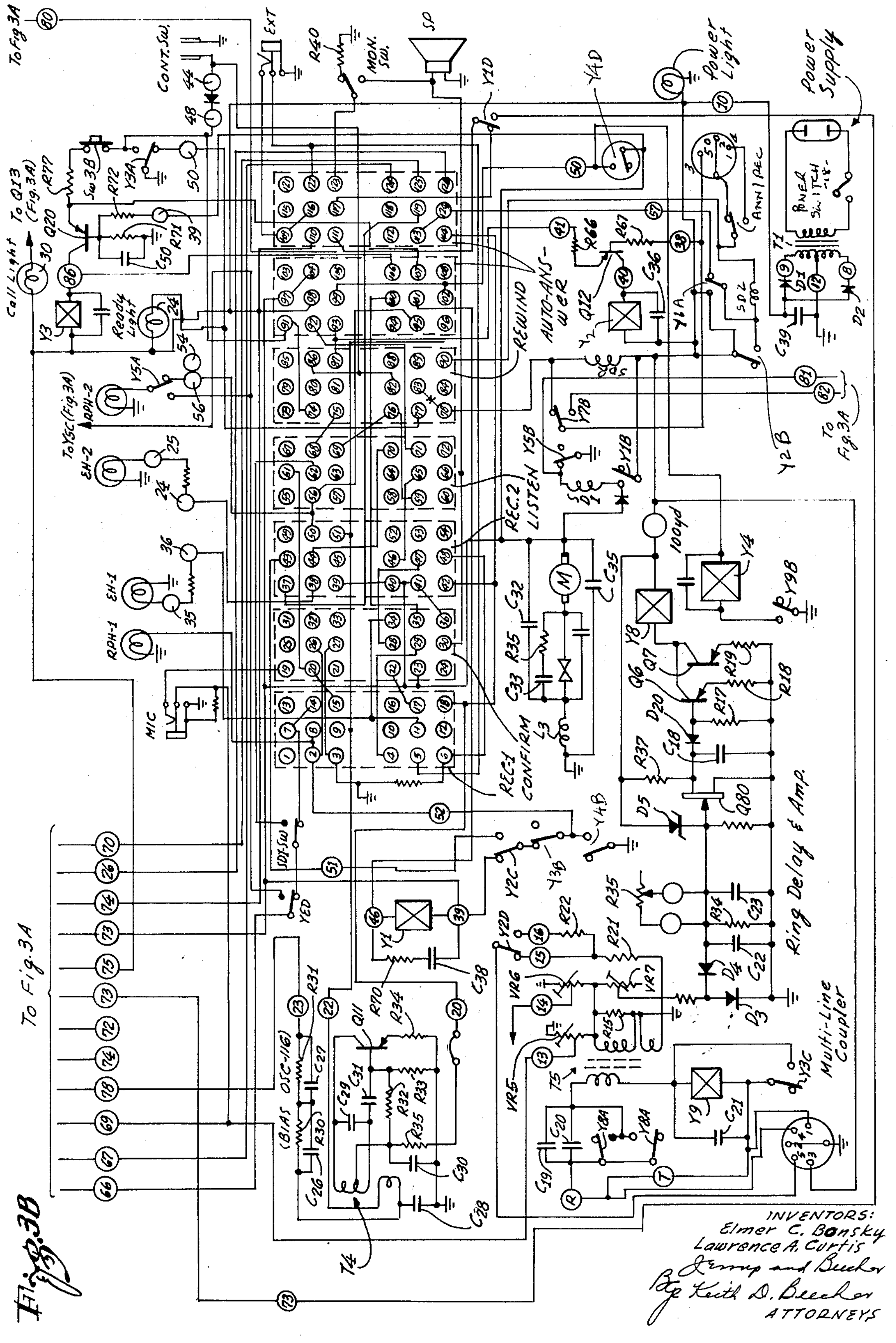

The push button switches "RECORD 1", "CONFIRM", "RECORD 2", "LISTEN", "REWIND" and "AUTO ANSWER" described in conjunction with FIG. 1, are double-pole, double-throw switches as shown in FIG. 3B. For example, when the "RECORD 1" push button switch is not actuated, its common terminals 2, 8 and 14 connect respectively with its upper terminals 1, 7 and 13; and its lower common terminals 5, 11 and 17 connect respectively with its upper terminals 4, 10 and 16. However, when the push button switch is actuated, its common terminals 2, 8 and 14 connect respectively with its lower terminals 3, 9 and 15; and its common terminals 5, 11 and 17 connect respectively with the lower terminals 6, 12 and 18. The other push button switches operate in the same manner to establish connections respectively between their numbered terminals.

As a preliminary setting for a system, it will be assumed that the "AUTO ANSWER" push button switch has been depressed, so that the system is in the stand-by mode waiting for an incoming ring to set it in operation. For that mode, the common terminals 92, 98, 104, 110, 116 and 122 of the "AUTO ANSWER" push button switch are connected respectively to the terminals 93, 99, 105, 111, 117 and 123; and the common terminals 95, 101, 107, 113, 119 and 125 of the switch are connected respectively to the terminals 96, 102, 108, 114, 120 and 126. For the actuated position of the "AUTO ANSWER" push button switch, a negative direct voltage is applied to the terminal 10 by the power supply in the lower right-hand corner of FIG. 3B, so that the power light 20 is energized. Assuming that the message tape is in its origin position, the switch "CONT-SW" in FIG. 3B is closed, and the call light 30 is also energized. The "READY" light 24 in FIG. 3B is also on, as its path is completed to ground through a normally closed relay contact Y3A.

Now, should a ring signal is received at the input terminals R, T from the telephone line, the signal is detected and amplified in the ring delay and amplifier circuit in the lower left-hand corner of FIG. 3B. This causes the relay Y8 to be energized so that the relay contacts Y8A close. The relay Y9 is also energized by existing DC line voltage, and this causes the relay contacts Y9A to close which seize the line. The relay contacts Y9B also close to energize the relay Y4. This, in turn, causes the relay contacts Y4B to close energizing the relay Y1.

AS shown in FIG. 3B, the relay Y9 is coupled across the terminals R, T through the primary of a transformer T5 and through a pair of parallel capacitors C19 and C20, the capacitors being shunted by relay contacts Y8A and Y9A. The relay Y9 is shunted by a capacitor C21. The input of the ring delay amplifier circuit is connected through a pair of diodes D3 and D4 and through a resistor R33 to a potentiometer VR8, the potentiometer being connected to a secondary winding of the transformer T5. The cathode of the diode RD3 is grounded, and the anode of the diode D4 is connected to a grounded capacitor C22 and to a grounded resistor R34. The anode of the diode D4 is also connected through a potentiometer R35 to a grounded capacitor R34.

When the ring signal is received, it is rectified by the diodes D3 and D4, and builds up a charge across the capacitor C23. After a predetermined number of rings is established by the potentiometer R35, sufficient charge is built up across the capacitor C23 to fire a unijunction transistor Q80. The gate electrode of the transistor Q80 is connected to a grounded resistor R36 and the source electrode of the transistor Q80 is grounded. The drain electrode is connected to a resistor R37, to a grounded capacitor C18, and to a diode D20. The anode of the diode D20 is connected to a grounded resistor R17 and to the base of a PNP transistor Q6. The transistor Q6 is connected as a Darlington amplifier with a further transistor Q7, and the collectors of the transistors are connected to the relay Y8. The emitter of the transistor Q6 is connected to a grounded resistor R18 and the emitter of the transistor Q7 is connected to a grounded resistor R18. The relay Y8 is connected back to the resistor R37 and through a Zener diode D5 to the gate electrode of the transistor Q80. With the relay Y1 energized, the relay contacts Y1A close so that the incoming messages may be introduced to the audio amplifier circuit appearing at the left-hand side of FIG. 3A through the terminals 26 and 28.

The audio amplifier circuit includes a 10 kilo-ohm resistor R6, and a 120 kilo-ohm resistor R7, a 300 picofarad capacitor C7, and a 50 ohm resistor R8 connected to the transistor Q2 as shown. The output from the transistor Q2 is introduced through a transformer T2 to a push-pull amplifier comprised of a pair of transistors Q3 and Q4, and which includes a 6 kilo-ohm resistor R9, a 1 kilo-ohm resistor R10, a 10 kilo-ohm resistor R11, and a diode SV31, connected as shown. The audio amplifier also includes an output transformer T3 whose primary is shunted by a 0.05 microfarad capacitor C11. The secondary of the transformer T3 is connected back to the emitter of the transistor Q2 through a 2 kilo-ohm resistor R12, and is connected to an output terminal designated 74. The resistor R12 is shunted by a capacitor C51. A PNP transistor Q5 is also included in the amplifier circuit, and its emitter is connected to the resistor R10 and to the mid-point of the primary of the output transformer T3. The collector of the transistor Q5 is connected to a 10 ohm resistor R14 and to a 5 kilo-ohm resistor R13, as well as to a grounded capacitor C10 of 1,000 microfarads. The base of the transistor Q5 is connected to a grounded 100 microfarad capacitor C13.

As long as the relay Y1 is energized, the system is set to an announcement transmitting mode, during which the recorded announcement on the recording tape is amplified by the audio amplifier circuit described above. The energizing of the relay Y4 when the system is first switched from its standby mode to its announcement mode by the receipt of a telephone ring signal, causes the relay contacts Y4D to close to energize the motor M. The circuit of the motor M as shown in FIG. 3B includes a filter choke L3, and it also has an associated filter network including capacitors C32, C33, C34 and C35. These capacitors have values of 0.1, 10, 0.01 and 0.5 microfarads, respectively. The filter also includes a resistor R35 having a resistance, for example, of 10 ohms. The motor M remains energized so long as the system is operational. The motor drives both the announcement tape and the message tape when their corresponding drive assemblies are activated by the selective energization of the solenoids SD1 and SD2. When the relay Y1 is energized and the system is in its announcement mode, the relay contacts Y1B to energize the solenoid SD1, so that the announcement tape may be activated. The announcement tape applies the audio signals corresponding to the announcement through the microswitch SD1-SW (which is now actuated) to the preamplifier circuit 111, which is shown in greater detail in FIG. 3A. The output from the preamplifier is then applied to the audio amplifier 102, and the amplified output from the audio amplifier is applied to the phone lines so that the announcement may be transmitted to the calling party.

The preamplifier circuit 111, as shown in FIG. 3A, includes a PNP transistor Q1, and the incoming signal from the announcement tape during the announcement mode is applied to the base of the transistor Q1. A series resonant trap circuit including a 0.002 capacitor C2 and an inductance coil L1 is connected between the base of the transistor Q1 and ground. Likewise, a pair of biasing resistors R1 and R2 have their common junction connected to the base of the transistor Q1. The resistor R1 may have a resistance of 10 kilo-ohms, and it is grounded. The resistor R2 may have a resistance of 40 kilo-ohms, and it is connected to the junction of a 2 kilo-ohm resistor R5 and a grounded 50 microfarad capacitor C3.

The collector of the transistor Q1 is connected to a 3 kilo-ohm resistor R4 and to a capacitor C5 of, for example, 10 microfarads. The emitter of the transistor Q1 is connected to a grounded 1 kilo-ohm resistor R3, which is shunted by a 30 microfarad capacitor C4. The base of the transistor Q1 is connected to the input terminal 66 of the pre-amplifier through a 10 microfarad capacitor C1, and the collector of the transistor Q1 is connected through the capacitor C5 to the output terminal 67 of the pre-amplifier.

As shown in FIG. 3A, the output terminal 67 is connected to a grounded 10 kilo-ohm potentiometer VR1. The series resonant trap C2, L1 serves to keep the signal from the bias oscillator 116 out of the pre-amplifier circuit. The potentiometer VR1 serves as a gain adjuster, and it controls the amplitude of the output signal from the pre-amplifier applied to the input of the amplifier 102 through the terminal 70. The terminal 70 is connected to a 10 microfarad capacitor C6, which, in turn, is connected to the base of a transistor Q2 and to the junction of a pair of resistors R6 and R7. The resistor R6 is grounded, and it has a value of 10 kilo-ohms. The resistor R7 has a value of 120 kilo-ohms.

The collector of the transistor Q2 is coupled back to the base through a 300 picofarad capacitor C7 and to the primary of a coupling transformer T2. A further grounded potentiometer VR3 is connected to the terminal 67, and itsmovable contact is connected to a further terminal 68. A terminal 71 is coupled through a capacitor C9 to the junction of the collector of the transistor Q2 and the primary of the transformer T2. The resistors R4, R5, R7 and R9, as well as the primary of the transformer T2 are connected to a 1 kilo-ohm resistor R10. The resistor R10 is connected to the emitter of a voltage regulator transistor Q4, the collector of which is connected through a 10 ohm resistor R14 to a terminal 72. The unidirectional excitation voltage for the amplifiers 102 and 111 is derived by way of the terminal 72, and the voltage is regulated by the transistor Q5. The collector of the transistor Q5 is connected to a 1,000 microfarad grounded capacitor C10, and to a 5 kilo-ohm resistor R13. The resistor R13 is connected to the base of the transistor Q5 and to a grounded capacitor C15.

The secondary of the transformer T2 is connected to a pair of PNP transistors Q3 and Q4 which are connected as a usual push-pull amplifier, the collectors of which are connected to the primary of an output transformer T3. A capacitor C11 is shunted across the collectors of transistors Q3 and Q4, and this capacitor has a value of 0.05 microfarads. A grounded 10 ohm resistor R11 is connected to the emitters of the transistors Q3 and Q4. The 6 kilo-ohm resistor R9 is connected to the mid-point of the secondary of the transformer T2 and to a grounded diode designated SV-31.

The secondary of the output transformer T3 is connected to ground and to the output terminal 74. A feedback connection from the secondary is also made through a 2 kilo-ohm resistor R12 to the emitter of the transistor Q2. A potentiometer VR8 of, for example, 5 kilo-ohms, is connected across the terminals 77 and 78. The terminal 78 is also connected to a 10 microfarad capacitor C12 which, in turn, is connected to the primary of the output transformer T3. The mid-point of the last-named primary is connected to the emitter of the voltage regulator transistor Q5.

During the announcement mode, and as described above, the relays Y4 and Y1, and the solenoid SD1, are energized, and the announcement signal from the announcement tape is passed through the actuated switch SD1-SW1, and amplified by the amplifiers 111 and 102, as described above. The amplified announcement signal from the audio amplifier 102 is applied to the lower winding of the transformer T5 in the lower left-hand corner of FIG. 3B, through a pair of contact Y2D and terminal 16 and through resistors R21 and R22, of 50 and 100 ohms respectively. In this way, the recorded announcement on the announcement tape is transmitted over the phone line. At the end of the announcement mode (T-1), the transistor Q12 in the circuit of FIG. 3A becomes conductive, and this causes the relay Y2 to be energized. The system is now switched from its announcement mode (T-1) in which the relays Y4 and Y1 were energized, to its message receiving mode (T-2) in which the relays Y4 and Y2 are energized.

The energization of the relay Y2 is achieved through the closed contacts 92 and 93 of the actuated "AUTO ANSWER" push button switch of FIG. 3B, and through a 5 ohm resistor R66 connected to the emitter of the transistor Q12, the collector of which is connected to the relay Y2. The other terminal of the terminal Y2 is connected to the B— lead. When the relay Y2 is energized, the relay contacts Y2C are actuated so as to de-energize the relay Y1. This causes the contacts Y1B to open de-energizing the soldnoid SD1 associated with the announcement tape. At the same time, the contacts Y2B close energizing the solenoid SD2 which, in turn, causes the message tape to be actuated and mode T-2 to be initiated. The incoming message from the calling party is now recorded on the message tape. The incoming message is amplified in the amplifier 102, and its output from terminal 78 is applied to the bias oscillator 116 by terminal 23 to modulate the alternating current bias output signal. Then, the modulated bias signal is applied to the switching contact 96, and then to the switching contact 95, and from there to the record head RPH-2 through the switch contact 56. Therefore, during the message recording mode T-2, the incoming message signal modulates the alternating current signal from the bias collector, and the resulting modulated signal is recorded on the message tape by the record head RPH-2.

At the same time, the output from the input/output amplifier 102 is fed to the switch contact 110 by the output terminal 74, and from there it is switched to the switch contact 111 and through the normally closed relay contacts Y1D to the switch contact 119, and from there to the switch contact 111, and through the switch contact 109 to the extension jack marked "EXT". Therefore, the incoming messages may be monitored, merely by turning the "MONITOR" switch to "ON". Therefore, during the announcement mode (T-1), the relays Y4 and Y1 are energized so that the announcement tape is actuated. During the message receiving and recording mode (percent-2), the relay Y4 remains energized, and the relay Y2 is energized, but the relay Y1 is de-energized. When the relay Y1 is de-energized, the snolenoid SD1 is de-activated so that the announcement tape is stopped at its origin position.

When Y4 is de-energized, the relay Y2 is de-energized since the contacts Y2C not only serve to de-energize Y1 when Y2 is energized, but also form a holding circuit for the relay Y2. Then, when the relay Y4 is de-energized, the contacts Y4B open to open the holding circuit for the relay Y2, and therefore the relay Y2 also is de-energized. The relay Y2 is shunted by a 200 microfarad capacitor C36 and the relay Y1 is shunted by a 500 microfarad capacitor C38 and a 100 ohm series resistor R70. During the transition from the announcement mode T-1 to the message recording mode T-2, during which the relay Y1 is de-energized and the relay Y2 is energized, the circuit C38, R70 produces a slight delay in the de-energization of the relay Y1, and an internal oscillation is set up when both Y1 and Y2 are on at the same time briefly, as the contacts Y1C and Y2A are closed setting up a regenerative feedback path in the amplifier 102. This produces a "beep" tone which is recorded on the message tape at the beginning of each message, and which serves as a message separation on the message tape.

The rewind operation is instituted by actuating the "REWIND" push button switch which comprises the switch contacts 73-90 in FIG. 3B. This, as mentioned above, causes the contacts 74, 80 and 86 to break with the contacts 73, 79 and 85 respectively, and to engage the contacts 75, 81 and 87; and causes the contacts 77, 83 and 89 to break with the contacts 76, 82 and 88, and to engage selectively with the contacts 78, 84 and 90. When the "REWIND" push-button switch is depressed, a ground is established at the upper end of the rewind solenoid SDR (FIG. 5B) through the switch contacts 77 and 78, and through normally closed contacts Y3A of a protective relay Y3, the latter relay being shunted by a 200 microfarad capacitor C37. The energizing of the solenoid SDR causes the message tape to rewind until it reaches its original position. When that occurs, the relay Y3 is energized through the start switch SW3B, and through a 10 kilo-ohm resistor R67, as well as through normally closed contacts Y3C and Y6A (FIG. 3A).

When the protective relay Y3 is energized, the normally closed contacts Y3A open to cause the rewind solenoid SDR to be de-energized, and the normally open contacts Y3A closed to form a holding circuit for the relay Y3. The normally closed contacts Y3B also open to assure that the relay Y1 is de-energized, and the normally open contacts Y3C close. When the contacts Y3C close, the relay Y2 again becomes energized to energize the solenoid SD2 to cause the message tape to start in its forward direction. The message tape moves forward to a position at which the relay Y2 is de-energized, and the system is ready for the next cycle.

The recorded messages on the message tape may be played back during a "LISTEN" mode by pressing the "LISTEN" push-button switch. This switch includes the switching contacts 55–72 of FIG. 3B, and it operates in the same manner as described above in conjunction with the "REWIND" push-button switch. When the "LISTEN" push-button switch is actuated, the relay Y2 is energized through the normally closed relay contacts Y3A, and the relay contacts Y2B close to energize the message tape solenoid SD2. The message tape transport now draws the tape across its playback head, and any messages recorded on the tape are sensed by the head.

The resulting output from the playback head during the "LISTEN" mode is introduced through the switch SD1-SW, which is in the illustrated position, and through the normally closed Y5D relay contacts to the input terminal 66 of the pre-amplifier 111. The signals are amplified in the pre-amplifier 111 and in the input-/output amplifier 102, and the resulting output from the amplifier 102 is passed to the speaker SP, and the recorded messages are reproduced by the speaker. The "LISTEN" mode continues until the sensing element of the message tape contacts a contact switch to energize the protective relay Y3. The relay Y2 is then de-energized as before, and the forward movement of the message tape is stopped since the solenoid SD2 is de-activated by the opening of the relay contacts Y2B.

In order to use the instrument as a tape recorder, the "RECORD 2" push-button switch of FIG. 1 is depressed to place the system in the "RECORD 2" mode. This switch includes the switch contacts 37–54 of FIG. 3B, and the switching connections are similar to the switching described above. The microphone 16 of FIG. 1 is plugged into the MIC receptacle 17. The motor M is energized during this mode, and the relay Y2 is energized, so that the relay contacts Y2B close to energize the solenoid SD2 which, in turn, actuates the pinch roller 70 of FIG. 5 to start the message tape. The signals from the microphone are applied to the pre-amplifier 111. The signals from the microphone 16 plugged into the jack 17 are passed through the switch SD1-SW (which is illustrated position) to the input of the pre-amplifier 111, and then to the input/output amplifier 102. The resulting output signals from the input/output amplifier 102 are applied by way of the output terminal 78 of the amplifier 102 and the input terminal 23 of the bias oscillator 116 to the bias oscillator. The signals modulate the alternating bias signal generated by the bias oscillator 116, and the modulated output appears at the output terminal 22 of the bias oscillator 116, and is then applied to the record head RPH-2 by way of the contacts 51 and 50 of the "RECORD 2" push-button switch.

The bias oscillator 116 is shown in circuit detail in FIG. 3B, and it includes a PNP transistor Q11. The bias oscillator 116 also includes resistors R32, R33, R34 and R35, connected as shown, and having respective values of 25 kilo-ohms, 1 kilo-ohm, 20 ohms and 500 ohms. Also included in the oscillator circuit are capacitors C28, C29, C30 and C31, connected as shown, and these capacitors have respective values of 0.001, 0.002, 50 and 0.005 microfarads. The aforesaid capacitors and resistors are connected in circuit with a regenerative transformer T4 in the manner shown, so as to create an oscillating circuit. The incoming audio signals are applied to a winding of the transformer T4 by way of the input terminal 23, and through a filter network made up of a pair of 10 kilo-ohm resistors R30, R31, and which are respectively shunted by capacitors C26 and C27 of 0.003 and 0.01 microfarads respectively. The other end of the winding of the transformer T4 is connected to the output terminal 22. Unidirectional excitation voltage for the circuit is achieved through the input terminal 20.

During the "RECORD 2" mode, the audio intelligence from the microphone 16 plugged into the MIC jack 17 is amplified in the amplifiers 111 and 102 of FIG. 3B, and used to modulate the alternating current output signal of the bias oscillator 116. The modulated output from the bias oscillator 116, as mentioned above, is then applied to the message tape record head RPH-2, so that the intelligence may be recorded on the message tape.

It should be noted that when the "AUTO ANSWER" switch is off, the B− lead is connected by the switch contacts 98 and 97 directly to the terminal 72 to energize the pre-amplifier 112 and input/output amplifier 102 and to the motor M so that the drive motor is energized. Also, the B- is applied to the contacts 35, 40 and 41 of the "RECORD 2" switch, so as to exert a bias through the 1.5 kilo-ohm resistor R38 on the erase head EH-2. This means that all previous recordings are erased by the erase head prior to the new recordings being made on the tape by the head RPH-2. As mentioned above, if the "REWIND" button is pushed at the same time as the "RECORD 2" button, the message tape may be erased during the rewind operation.

During the "RECORD 1" operation, during which an announcement is recorded on the announcement tape, the "RECORD 1" push-button switch is actuated, which includes the contacts 1–18. The erase head EH-1 (FIG. 3B) is now biased through the 15 kilo-ohm resistor R37 which is connected to the B− lead by way of the switch contacts 11, 12, 18, 17, 22 and 23, so that the previous announcement is erased prior to the recording of the new announcement. As in the case of the "RECORD 2" mode, the audio signals from the microphone 16 as plugged into the jack 17 are amplified in the amplifier 111 and 102, and are caused to modulate the output of the bias oscillator 116. The modulated output is then applied to the record head RPH-1 through the switch contacts 8 and 9 of the "RECORD 1" push-button switch.

During the "RECORD 2" mode, the Y2 relay is energized so as to energize the solenoid SD2 to cause the message tape to move forward. During the "RECORD 1" mode, the relay Y1 is energized and the resulting closing of the relay contacts Y1B causes the solenoid SD1 to be energized so that the announcement tape may be moved. The audio signal from the microphone may then be recorded on the announcement tape, as described above, and this recording may continue until a sensing element energizes the protective relay Y3, which de-energizes the relay Y1 so that the movement of the announcement tape is stopped.

The calling party cut off circuit 113 is shown in FIG. 3A, and it includes an input terminal 73 which is connected to the relay Y1, and which connects with the collectors of a pair of transistors Q8 and Q9. The emitter of the transistor Q8 is connected to a grounded 2.5 ohm resistor R24, and the emitter of the transistor Q9 is connected to a grounded 1 kilo-ohm resistor R25. The base of the transistor Q8 is connected to the emitter of the transistor Q9, and the base of the transistor Q9 is connected to a grounded 10 kilo-ohm resistor R26 and to a diode D1. The diode D1 is connected to a resistor R30 and to a 15 kilo-ohm resistor R23. The latter resistor is connected through an input terminal 75 to the relay Y3 of FIG. 3B. The resistor R30 is connected through a diode D2 to a grounded 10 kilo-ohm resistor R27 and to the base of a transistor Q10. The emitter of the transistor Q10 is connected to a grounded resistor R28, to a 4.7 microfarad capacitor C24, and to a resistor R31. The capacitor C24 is connected to a grounded resistor R29 and to the base of a transistor Q11. The emitter of the transistor Q11 is grounded, and its collector is connected to a terminal 74 which connects with contact 92 of the "AUTO ANSWER" switch in FIG. 3B. The collector of the transistor Q10 is connected through a resistor R31 to the emitter of a transistor Q12A. The collector of the transistor Q12A is connected to a terminal 73, and to a resistor R32 of 4.7 kilo-ohms. The resistor R42 is connected to the base of the transistor Q12A and to a grounded 100 microfarad capacitor C25.

During the T-1 mode during which the announcement message is being read out over the phone line, B— is applied to the voltage regulator transistor Q12A and also to the resistor R23 from the relay Y3. The current from the relay Y3 flows through the resistor R23. A positive voltage of, for example, 2.5 volts appears at the anode of the diode D1, thus biasing the transistors Q8 and Q9 to a non-conductive state. The transistor Q10 is biased through the diode D2 which allows current from the voltage regulator transistor Q13 to flow through the collector-emitter of the transistor Q10 to ground, thus preventing the transistor Q11 from turning on which, in turn, prevents the relay Y2 from becoming energized.

However, if the caller should hang up during the T-1 mode during which the announcement is being transmittd, a voltage reversal will appear at the R and T input in the lower left-hand corner of FIG. 3B, and this will cause the relay Y9 to become de-energized, so that the telephone line will be released by the opening of the relay contacts Y9A. The contacts Y9B will also open, so that the relay Y4 is de-energized, thereby opening the relay contacts Y4B. A new ground for the relay Y1 will be established through the transistors Q8 and Q9 of the calling party cutoff circuit 113, so as to permit the T1 cycle to be completed, and the announcement tape to return to its origin position, even though the announcement is no longer being sent over the line. When the switch SO-SWL of the announcement tape of FIG. 3A shorts to ground, the voltage at the anode of the diode D1 in the cut-off circuit 113 will short to ground, thus de-energizing the transistors Q8 and Q9 (D1 normally makes the transistors Q8 and Q9 conductive, and D2 normally makes the transistor Q10 conductive), and this will cause the relay Y1 to become de-energized. The motor M is controlled by the relay contacts Y1B and Y4D.

If a ring signal is received, the contacts Y1B and Y4D will close energizing the motor, as mentioned above. However, should the calling party hang up during the announcement mode T-1, and as described above, the relay Y4 will become de-energized, so that the relay contacts Y4D will open. However, the motor will remain energized through the relay contacts Y1B. However, when the announcement tape has reached its origin position, the switch SO-SW1 grounds to de-energize the relay Y1, as mentioned above, so that the contacts Y1B open and the motor stops. Also, when the contact Y4D opens, the exciting voltage B- is removed from the calling party cut-off circuit 113. Therefore, if Y4 is de-energized, Y2 will become de-energized because the transistor Q11 becomes non-conductive and the relay contacts Y4B open removing both grounds from the transistor Q12.

The transistor Q11 helps with the switching from the announce mode T-1 to the record incoming message mode T-2, in the event that the calling party does not hang up during T-1. When the mode T-1 switches to the mode T-2, the transistor Q11 will become conductive immediately, applying a ground to the transistor Q12, and causing the transistor Y2 to become energized. This causes the contacts Y2C to close, also applying a ground to Q12 as a holding circuit. When the calling party hangs up during the T-2 mode, and at the end of the message, a voltage reversal will also appear at the RT input, and the transistor Y9 will de-energize. This causes the relay contacts Y9A to open releasing the line. The relay contacts Y9B also will open, and the relay Y4 will become de-energized. This causes the relay contacts Y4B to open breaking ground for Q12, and the contacts Y4D will open and the motor M will stop. Q11 now becomes non-conductive, Q12 becomes non-conductive, and the relay Y2 de-energized to stop the message recording tape.

The system includes a remote signal filter and amplifier designated 130 in FIG. 3A. The remote tone is introduced to the amplifier from the terminal 14 in the lower right-hand corner of FIG. 3B, and it appears across a potentiometer VR10 at the input of the circuit 130. In this way the received tone signal may be introduced into the circuit 130 by way of the input terminal 68, and with a selected amplitude level divided by the adjustment of the potentiometer VR10. The remote signal is derived across a winding of the transformer T5 at the lower right-hand corner in FIG. 3B, which winding is shunted by a 600 ohm resistor R15, and the signal is applied to the remote signal amplifier circuit 130 by way of the potentiometer VR6 and terminal 14.

The remote signal and amplifier is shown in circuit detail in FIG. 3A. It includes a pair of PNP transistors Q14 and Q15. The input terminal 58 of the circuit is connected to a 10 microfarad coupling capacitor C41 which, in turn, is connected to the base of the transistor Q14 and to the junction of a pair of resistors R47 and R48. The resistor R47 has a value of 10 kilo-ohms and is grounded, and the resistor R48 has a value of 40 kilo-ohms. The emitter of the transistor Q14 is connected to a 1 kilo-ohm resistor R50 which is shunted by a 30 microfarad capacitor C42. The resistor R50 is connected to a grounded 33 ohm resistor R49. The collector of the transistor Q14 is connected to a 3 kilo-ohm resistor R51 and to the junction of a pair of 10 microfarad capacitors C43 and C44. The capacitor C43 is connected to a pair of back-to-back grounded diodes D9 and D10. The capacitor C44 is connected to the junction of a pair of resistors R52 and R53 and to the base of the transistor Q15. The resistor R52 has a value of 10 kilo-ohms and is grounded, and the resistor R53 has a value of 50 kilo-ohms.

The emitter of the transistor Q15 is connected to a 1 kilo-ohm resistor R53 which is shunted by a 30 microfarad capacitor C45. The resistor R55 is connected to a grounded 200 ohm resistor R54. The collector of the transistor Q16 is connected to a 3 kilo-ohm resistor R56, and to a 100 kilo-ohm resistor R57. The resistor R57 is connected to a terminal T of a suitable microfork vibratory assembly, the assembly having a further terminal S connected to the base of a transistor Q16, and a grounded terminal G. The emitter of the transistor Q16 is connected to a grounded 5 kilo-ohm resistor R59. The base is connected to a 200 kilo-ohm resistor R58.

The emitter of the transistor Q16 is also connected to a 10 microfarad capacitor C46 to the junction of a pair of diodes D11 and D12. The cathode of the diode D11 is grounded, and the anode of the capacitor C12 is connected to a grounded 50 microfarad capacitor C47 and to a grounded 20 kilo-ohm potentiometer VR9. The potentiometer is connected to a grounded 10 microfarad capacitor C48 and to the base of a transistor Q17. The collector of the transistor Q17, together with the collector of a transistor Q18 are connected through the coil of a relay Y0 to the output terminal 60 which is connected to a further output terminal 59 by a jumper connection.

A voltage regulator transistor Q19 has its emitter connected to the resistor R48, R51, R56, R58 and to the collector of the transistor Q16. The collector of the transistor R62 is connected between the collector and base of the transistor Q19. The base is also connected to a grounded 200 microfarad capacitor C49. When the remote signal amplifier circuit 130 is energized, a unidirectional voltage is applied to the terminal 59, this voltage being derived, for example, from the switch contacts 107 and 108 of the "AUTO ANSWER" push-button switch, and through the closed contacts Y4D and through the "AUTO ANSWER" switch contacts 99 and 98 to the B— lead in FIG. 3B.

The microfork assembly is tuned, in known manner, to respond to a particular tone frequency, and only when that tone is received by the remote signal amplifier circuit 130 is the amplified tone from the transistor Q15 passed on to the transistor Q16. When that occurs, the output from the transistor Q16 is rectified so that a negative charge is produced across the capacitor C16 to render the transistors Q17 and Q18 conductive, so as to provide a current path for the relay Y0 to energize the relay. Therefore, when the system is in the "AUTO ANSWER" mode, and when the proper tone is transmitted to the equipment, the relay Y0 is energized. The tone should be transmitted during the announcement interval when Y1 is also energized, so that the tone is received during the message announcement mode when both the relays Y4 and Y1 are energized, and when the "AUTO ANSWER" push-button switch is actuated.

Now, when the proper tone is received, and the relay Y0 is energized, the contact Y01 closes, so that the relay Y5 is energized, as the circuit is completed through the normally closed contacts Y6C and Y6D, and through the grounded 40 ohm resistor R64. The relay Y6 is also energized at this time as the contacts Y5C close. The relay Y0 drops out when the tone signal stops, but the relays Y5 and Y6 remain energized. The rewind solenoid SDR is now energized as the relay contacts Y5B close, so that the mssage tape 64 is rewound to its origin position. When the message tape reaches its origin position at the end of the rewind operation, the switch CONT-SW1 closes to energize the relay Y7. The normally closed relay contacts Y7B now opens to de-energize the solenoid SDR.

The message solenoid SD2 is now energized through the closed contacts Y7A, and the message tape 64 begins to move in its forward direction. The recorded messages on the message tape are sensed by the head RPH-2 and are applied through the closed relay contacts Y5A and 5D and through the switch SD1-SW to the preamplifier 111. The amplified signals are further amplified by the input/output amplifier 102. The output from the input/output amplifier 102 is applied across the "AUTO ANSWER" switch contacts 110 and 111, and across the closed relay contacts Y1D, and through the normally closed relay contacts Y2D, to the input/output circuit 103 for transmission over the phone lines to the person originating the tone.

It might be pointed out that during the remote mode, the relay Y2 is not energized, and the message solenoid SD2 is activated by the relay Y7, as described above. The relay Y1, however, is energized. Even though the relay Y1 is energized, the announcement tape solenoid SD-1 is not energized during the remote mode because the normally closed relay contacts Y5B are now open. It might also be pointed out that during the remote mode, the negative potential B— is applied to the lead connected to the remote signal filter and amplifier 130 and to the relays Y0, Y5 and Y7, the connection being completed through the switch contacts 107 and 108, 99 and 98 of the actuated "AUTO ANSWER" push button switch, and through the closed relay contacts Y4D.

After the calling party has received the messages from the message tape, he should again transmit the tone signal over the phone line. If this is done, the relay Y0 is again energized which causes the relay contacts Y0 to close shorting out the relay T5 and causing it to be de-energized. Then, when the tone is terminated, the relay Y6 is de-energized which causes the relay Y7 to be de-energized and the message tape stopped at that point, and the system is now in readiness to receive and record additional messages. The calling party may then transmit a further tone over the phone lines, and the further tone will set the system to the rewind mode, as mentioned above, so as to return the message tape to its origin position. At that point, the calling party may transmit yet a further tone signal to stop the message tape at its origin position, so that the system is then in readiness to receive and record an entirely new set of messages.

As mentioned above, the remote calling unit can send a second signal for backspace purpose. This second signal is picked up by the backspace microfork circuit 131 of FIG. 3A, and which includes transistors Q26, Q27, Q28 and Q29 connected in circuit with a microfork designated F2, and which may have a response frequency of, for example, 997.5 Hz. The output of the microfork F2 is amplified by the amplifier circuits formed by the transistors Q26 and Q27. The output of the transistor Q27 is rectified by the diodes D16 and D17, and the resulting direct currents are used to charge the capacitors C76 and C77, and a positive bias is produced at the base of the transistor Q29. When the capacitors C76 and C77 are charged, they cancel the bias of Q29, and the transistor Q29 becomes non-conductive, and the system goes into a rewind mode.

When the backspace signal ceases, the capacitors C76 and C77 discharge through the resistor R99. The transistor Q29 is negatively biased by the resistor R100, and the transistor Q28 instantly energizes, and then the transistor Q29 becomes non-conductive. The relay Y7 is then energized. The rewind stops and the playback mode begins by the contact Y7B. Therefore, whenever the calling party wishes to backspace, he merely transmits the second signal which causes the system to go into a rewind mode, and the rewind mode continues so long as the second signal is transmitted. However, as soon as the calling party terminates the second signal, the rewind stops and the playback mode begins as the relay Y7 is de-energized and the contact Y7B moves to de-energize the rewind solenoid SDR, and the contact Y1A moves to energize the message tape solenoid SD2.

Should the calling party hang up during the remote playback mode of the system, the relay Y4 will become de-energized in the same manner as described in conjunction with the announcement mode T-1. This causes the relay contact Y4A to open, which breaks the ground of Y6. Therefore, the relays Y7 and Y5 de-energize, and the message tape stops. Since the switch SO-SW-1 on the announcement tape is not shorted to ground, a voltage will appear at the anodes of the diodes D1 and D2 in the calling party cut-off circuit 113, and the transistors Q8 and Q9 will be rendered conductive, establishing a ground to the relay Y1. The system will then enter the T-1 mode and continue throughout the remaining cycle until the switch SO-SW-1 shorts to ground, at which point the unit is reset and in condition to answer the next call.

While a particular embodiment of the invention has been shown and described, modifications may be made, and it is intended in the following claims to cover all such modifications which fall within the spirit and scope of the invention.

What is claimed is:

1. In a telephone answering system to be coupled to a telephone line and which comprises an announcement storage means, a message storage means and respective associated transducers, and which also includes first and second means for driving said announcement storage means and said message storage means respectively for producing a recorded announcement from the announcement storage means in response to ring signals on said line and for subsequently recording a message from the calling party on said message storage means, the combination of: a first control circuit including means for activating said message storage driving means in response to said ring signals so as to initiate the recording of the aforesaid message on said message storage means; a second control circuit including means for deactivating said message storage driving means to terminate the recording of the aforesaid message on said message storage means; a further circuit coupled to said second control circuit and to said line and including means for introducing a signal to said second control circuit to cause said second control circuit to de-activate said message storage driving means in response to a calling party hang-up signal received over the line; a third control circuit including means responsive to a tone signal of a first predetermined frequency received over the line for activating said message storage driving means, a further control circuit including means for causing said transducer associated with said message storage means to transmit over the line signals corresponding to the message recorded on said message storage means, and a fourth control circuit including means responsive to a second tone signal received over the line and of a second predetermined frequency different from said first predetermined frequency for activating said message storage driving means during the reception of the second tone signal for causing said message storage means to backspace.

2. In the telephone answering system defined in claim 1, and which includes ring delay circuitry interposed between said line and said first control circuit, said ring delay circuitry including adjustable means to cause said first control circuit to activate said message storage driving means only after a predetermined number of ring signals have been received.

* * * * *